United States Patent [19]
Bowling

[11] Patent Number: 4,997,590
[45] Date of Patent: Mar. 5, 1991

[54] PROCESS OF COLORING STABILIZED BLEACH ACTIVATOR EXTRUDATES

[75] Inventor: Ernie Bowling, West Harrison, Ind.

[73] Assignee: The Procter & Gamble Company, Cincinnati, Ohio

[21] Appl. No.: 288,737

[22] Filed: Dec. 22, 1988

[51] Int. Cl.[5] .................... C09K 3/00
[52] U.S. Cl. .................... 252/186.31; 252/186.3; 252/186.38; 252/186.27
[58] Field of Search .................... 252/186.25, 186.31, 252/186.38, 96; 8/525, 526; 427/214

[56] References Cited

U.S. PATENT DOCUMENTS

| | | | |
|---|---|---|---|
| 3,691,090 | 9/1972 | Kitajima et al. | 252/186.25 |
| 3,755,201 | 8/1973 | Trimmer et al. | 8/525 |
| 4,009,113 | 2/1977 | Green et al. | 252/186.38 |
| 4,097,418 | 6/1978 | Rolfes | 252/186.38 |
| 4,283,301 | 8/1981 | Diehl | 252/186.38 |
| 4,399,049 | 8/1983 | Gray et al. | 252/186.38 |
| 4,412,934 | 11/1983 | Chung et al. | 252/186.38 |
| 4,420,412 | 12/1983 | Wong | 252/186.25 |
| 4,434,068 | 2/1984 | Delwel et al. | 252/186.38 |
| 4,444,674 | 4/1984 | Gray | 252/186.25 |
| 4,486,327 | 12/1984 | Murphy et al. | 252/186.38 |
| 4,536,314 | 8/1985 | Hardy et al. | 252/186.38 |
| 4,668,475 | 5/1987 | Meloy | 252/186.25 |
| 4,671,886 | 6/1987 | Mueller | 8/525 |
| 4,681,695 | 7/1987 | Divo | 252/186.38 |
| 4,762,636 | 8/1988 | Balliello et al. | 252/186.25 |
| 4,830,773 | 5/1989 | Olson | 252/186.25 |
| 4,869,843 | 9/1989 | Saito et al. | 252/186.25 |
| 4,921,631 | 5/1990 | Gradwell et al. | 252/186.25 |

FOREIGN PATENT DOCUMENTS

| | | | |
|---|---|---|---|
| 658626 | 2/1963 | Canada | 8/525 |
| 0106634 | 4/1984 | European Pat. Off. | 252/186.38 |
| 1050127 | 12/1966 | United Kingdom | 252/95 X |
| 1248994 | 10/1971 | United Kingdom | 252/95 X |
| 1281796 | 7/1972 | United Kingdom | 252/186.38 |
| 2199338A | 7/1988 | United Kingdom | 252/186.38 |

*Primary Examiner*—Robert L. Stoll
*Assistant Examiner*—Joseph D. Anthony
*Attorney, Agent, or Firm*—Kathleen M. Harleston; Donald E. Hasse; Thomas H. O'Flaherty

[57] ABSTRACT

This invention relates to a process for applying water-soluble dye or water-dispersible pigment to stabilized bleach activator extrudates in a manner which avoids agglomeration and allows even coating of the bleach activator extrudates. This is accomplished by adding water-soluble hydratable material and the dye or pigment to an aqueous solution, and then distributing the aqueous solution on the bleach activator extrudates. The bleach activator extrudates comprise specific peroxygen bleach activators and select binder materials. This invention also relates to colored bleach activator extrudates made according to this process.

15 Claims, No Drawings

PROCESS OF COLORING STABILIZED BLEACH ACTIVATOR EXTRUDATES

TECHNICAL FIELD

This invention relates to a process for coloring stabilized bleach activator extrudates, and compositions made by this process. More particularly, this invention relates to a process for applying stable water-soluble dye or water-dispersible pigment to stabilized bleach activator extrudates in a manner which avoids agglomeration and allows even coloring of the bleach activator extrudates, as well as compositions made by the process. This is accomplished by adding water-soluble hydratable material to an aqueous solution containing the dye or pigment, and then distributing the aqueous solution on the bleach activator extrudates. The stabilized bleach activator extrudates comprise specific peroxygen bleach activators and select binder materials. The resulting colored bleach activator extrudates are admixed in a final granular detergent product comprising a peroxygen bleaching compound capable of yielding hydrogen peroxide in an aqueous solution.

BACKGROUND OF THE INVENTION

A bleach activator can generally be described as an organic peroxyacid bleach precursor which in the bleaching solution reacts with an inorganic peroxygen bleaching agent with release of the organic peroxyacid. Peroxygen bleaches are especially effective at removing oxidizable stains from hard surfaces or fabrics at temperatures less than about 60° C.

Water-soluble bleach activators in particular have rapid dispersibility in wash or bleach solution as well as the ability to exhibit surface bleaching. Described in detail in U.S. Pat. No. 4,412,934, Chung et al., issued Nov. 1, 1983 are water-soluble bleach activators, having the general formula:

wherein R is an alkyl group containing from about 5 to about 18 carbon atoms wherein the longest linear alkyl chain extending from and including the carbonyl carbon contains from about 6 to about 10 carbon atoms and L is a leaving group, the conjugate acid of which has a pKa in the range of from about 6 to about 13.

However, water-solubility exacerbates bleach activator stability problems caused by interaction between moisture and peroxygen bleaching agent during prolonged storage in the bleach or detergent composition. To address this, U.S. Pat. No. 4,681,695, Divo, issued July 21, 1987 teaches a bleach activator composition in the form of spray-dried granules having an inner core comprising water-soluble organic peroxyacid bleach precursor and a surface coating comprising a water-soluble or water-dispersible inorganic hydratable material. A process of making the composition by forming a crutcher slurry mix of the bleach precursor and hydratable material, adjusting the pH between about 3 and 8, and spray drying is also disclosed.

U.S. Pat. No. 4,536,314, Hardy et al., issued Aug. 20, 1985 teaches detergent compositions, detergent additive products and bleaching compositions containing non-linear aliphatic peroxyacid bleach precursors of formula:

where L is a leaving group of defined formula whose conjugate acid has a pKa of from 6 to 13 and

is a non-linear acyl group, the carboxylic acid derivative of which has a $\log P_{oct}$ in the range from 1.9 to 4.0 (where $P_{oct}$ is the partition coefficient between octanol and water). New precursor compounds are provided in which

is a $C_7$–$C_{17}$ branched aliphatic acyl group containing a linear chain of at least 5 carbon atoms extending from and including the carbonyl carbon wherein the branching is on at least the 2- and/or 3-carbon atom. These non-linear aliphatic peroxyacid precursors provide effective bleaching of oxidizable stains without generating unattractive odors.

U.S. Pat. No. 4,009,113, Green et al., issued Feb. 22, 1977, discloses granular compositions comprising from about 40% to about 80% of a bleach activator and an inert carrier material such as long chain fatty acids or esters wherein said precursor is substantially evenly distributed with said precursor compound to form a composite particle. The particle has an outer protective layer which can consist of, for example, polyvinyl alcohol. It is stated that such compositions have both good storage stability and dispersibility in the wash water.

Lastly, U.S. Pat. No. 4,486,327, Murphy et al., issued Dec. 4, 1984, discloses bleach activator bodies comprising specific peroxygen bleach activators and select binder materials. When formulated in such bodies the peroxygen bleach activators have excellent storage stability and maintain excellent dispersibility in wash water.

It has been found, however, that a problem can be encountered when coloring the bleach activators of Chung et al. (see above), which have been stabilized in the manner of Murphy et al. (see above) and formed into extrudates. When an aqueous solution containing dye or pigment is applied to the bleach activator extrudates, a significant number of them may stick together, forming undesirable agglomerates. Apparently because these sizable agglomerates capture some of the dye or pigment, the bleach activator extrudates are not as evenly or as brightly colored as they would be without agglomerates. In addition to being an appearance negative, heavily dyed agglomerates in product increase the risk of fabric damage by the dye. The agglomerates must be sifted out before the bleach activator extrudates can be used. The extrudates are then admixed with, for example, base detergent granules to form a colored or speckled final granular detergent product.

This problem has now been solved by the instant discovery that incorporating water-soluble hydratable material into the aqueous solution containing the stable water-soluble dye or water-dispersible pigment, followed by distributing the aqueous solution on the surface of the stabilized bleach activator extrudates, preferably in a substantially even manner such as by spraying the solution, results in evenly colored, free-flowing bleaching activator extrudates. The extrudates are then admixed in a final granular detergent product comprising a peroxygen bleaching compound capable of yielding hydrogen peroxide in an aqueous solution. The molar ratio of hydrogen peroxide to bleach activator compound in the final product is greater than about 1.5.

SUMMARY OF THE INVENTION

The present invention comprises a process for the production of colored stabilized bleach activator extrudates, said process comprising the steps of:

(a) obtaining stabilized bleach activator extrudates comprising, by weight:

(i) from about 50% to about 98% of bleach activator compound of the general formula

wherein R is an alkyl group containing from about 5 to about 18 carbon atoms wherein the longest linear alkyl chain extending from and including the carbonyl carbon contains from about 6 to about 10 carbon atoms and L is a leaving group, the conjugate acid of which has a pKa in the range of from about 6 to about 13; and (ii) from about 2% to about 50% of a binder material selected from the group consisting of nonionic surfactants, polyethylene glycols, anionic surfactants, film forming polymers, fatty acids, and mixtures thereof, wherein said binder does not melt below about 40° C.;

wherein (i) and (ii) are substantially evenly distributed throughout said extrudates; the bulk density of said extrudates is between about 0.4–0.8 g/cc; and the amount of water in said extrudates is less than about 5%;

(b) distributing on said stabilized bleach activator extrudates an aqueous solution consisting essentially of stable water-soluble dye or water-dispersible pigment and from about 5% to about 30% by weight of water-soluble hydratable material; and (c) admixing said resulting dyed or pigmented stabilized bleach activator extrudates in a final granular detergent product comprising a peroxygen bleaching compound capable of yielding hydrogen peroxide in an aqueous solution, wherein the molar ratio of hydrogen peroxide yielded by said peroxygen bleaching compound to said bleach activator compound is greater than about 1.5.

The present invention also comprises the product of this process.

The water-soluble hydratable material is preferably water-soluble inorganic hydratable salt, more preferably strong acid hydratable salt, most preferably sodium sulfate.

DETAILED DESCRIPTION OF THE INVENTION

This invention relates to a process for dying or pigmenting stabilized bleach activator extrudates in a manner which avoids the formation of extrudate agglomerates. The result is evenly colored, free-flowing bleach activator extrudates which are admixed in a final granular detergent product comprising a peroxygen bleaching compound capable of yielding hydrogen peroxide in a aqueous solution to form an attractive speckled granular detergent product. This invention further relates to the product of this process.

The first step of the invention is obtaining stabilized bleach activator extrudates. The bleach activator compounds utilized in the present invention are described in U.S. Pat. No. 4,412,934, Chung et al., issued Nov. 1, 1983, which is incorporated herein. U.S. Pat. No. 4,486,327, Murphy et al, issued Dec. 4, 1984, which is incorporated herein, discusses stabilization of certain bleach activator compounds by inclusion of the binder materials used in the present invention.

Bleach Activator Compound

The bleach activator compound of the first step of the invention has the general formula:

wherein R is an alkyl group containing from about 5 to about 18 carbon atoms wherein the longest linear alkyl chain extending from and including the carbonyl carbon contains from about 6 to about 10 carbon atoms and L is a leaving group, the conjugate acid of which has a pKa in the range of from about 6 to about 13.

The R alkyl group preferably contains from about 7 to about 11 carbon atoms wherein the longest linear alkyl chain extending from and including the carbonyl carbon contains from about 6 to about 10 carbon atoms, and L is a leaving group the conjugate acid of which preferably has a pKa in the range of from about 8 to about 11. L is more preferably selected from the group consisting of:

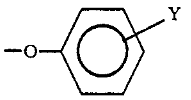

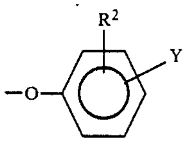

and

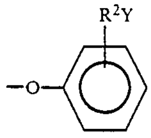

wherein $R^2$ is an alkyl chain containing from about 1 to about 8 carbon atoms, and Y is $—SO_3—M^+$ or $—COO—M^+$ wherein $M^+$ is sodium or potassium.

The bleach activator compound is most preferably

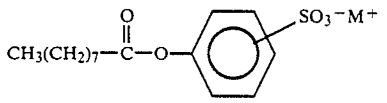

wherein $M^+$ is sodium or potassium. This is called nonanoyl oxybenzene sulfonate.

The stabilized bleach activator extrudates comprise from about 50% to about 98%, preferably from about 80% to about 90%, by weight, of the above described bleach activator compound. The extrudates also comprise from about 2% to about 50%, preferably from about 10% to about 20%, by weight, of a binder material which stabilizes the bleach activator compound and is described below.

Binder Material

The binder material is selected from the group consisting of nonionic surfactants, polyethylene glycols, anionic surfactants, film forming polymers, fatty acids, and mixtures thereof wherein said binder does not melt below about 40° C.

As described in U.S. Pat. No. 4,486,327, Murphy et al., these binder materials are used to stabilize certain bleach activator compounds which may react with moisture in the environment in which they are stored or in the bleaching or detergent composition they are in. Without stabilizers, these bleach activator compounds may also interact with other bleaching (e.g., perborate) or detergent components if they are incorporated into a bleaching or detergent composition. The binder material, in which term we here include enrobing materials (see U.S. Pat. No. 4,486,327), protects the bleach activator compound without substantially inhibiting its dispersibility. If the extrudate is placed in a detergent composition, the binder (or enrobing) material should not be reactive with the components of the detergent composition upon storage. Ideal binder or enrobing materials have a low hygroscopicity upon storage but should be soluble or dispersible in water. This allows for dispersion and release of the peroxygen bleach activator in the bleach or wash solution. It is also essential that the employed binder (or enrobing) materials do not melt below about 40° C. because frequently the storage temperature for such compositions is as high as 40° C. Any melting of the binder (or enrobing) material would result in the bleach activator being quite unstable.

Examples of nonionic surfactants that can be utilized as binder (or enrobing) materials are the condensation products of primary or secondary aliphatic alcohols having from 8 to 24, and preferably about 9 to about 18, carbon atoms, in either a straight or branched chain configuration, with from about 35 to about 100 moles, and preferably about 40 to about 80 moles, of ethylene oxide per mole of alcohol. The preferred nonionic surfactants are prepared from primary alcohols which possess either linear (such as those derived from natural fats, or prepared by the Ziegler process from ethylene, e.g., myristly, cetyl, and stearyl alcohols), or partly branched carbon chains (such as the Dobanols and Neodols from Shell which have about 25% 2-methyl branching); Synperonics from ICI, which are understood to have about 50% 2-methyl branching; or the primary alcohols having more than 50% branched chain structure (sold under the trade name Lial by Liquichimica).

Other suitable nonionic surfactants are the polyethylene oxide condensates of alkyl phenols. These include the condensation products of alkyl phenols having an alkyl group containing from 6 to 12 carbon atoms, in either a straight or branched chain configuration, with ethylene oxide. The ethylene oxide is preferably present in amounts of about 35 to about 100, more preferably about 40 to about 80, moles of ethylene oxide per mole of alkyl phenol. The alkyl substituent in such compounds may be derived, for example, from polymerized propylene, di-isobutylene, octene and nonene.

Nonionic surfactants suitable for use herein also include the compounds formed by condensing ethylene oxide with a hydrophobic base. The hydrophobic base is formed by the condensation of propylene oxide with propylene glycol. The molecular weight of the hydrophobic portion generally falls in the range of about 1500 to 1800. Such synthetic nonionic detergents are items of commerce. They are available from Wyandotte Chemicals Corporation as "Pluronics".

Suitable polyethylene glycols are homopolymers of ethylene oxide having the general formula $$HO(C_2H_4O)_nH,$$

and having an average molecular weight of from about 2,000 to about 15,000, preferably from about 3,000 to about 10,000, and most preferably from about 4,000 to about 8,000.

The fatty acids suitable for use in the stabilized extrudates of the present invention include the higher fatty acids containing from about 8 to about 24, and preferably from about 9 to about 18, carbon atoms. Also preferred are mixtures of fatty acids and nonionic binder materials, e.g., polyethylene glycols or nonionic surfactants.

Suitable anionic surfactants useful as binder (or enrobing) materials in the extrudates of the present invention include the water-soluble salts, preferably the alkali metal, ammonium and alkylolammonium salts, of organic sulfuric reaction products having in their molecular structure an alkyl group containing from about 8 to about 20 carbon atoms and a sulfonic or sulfuric acid ester group. (Included in the term "alkyl" is the alkyl portion of acyl groups.) The preferred anionic surfactants are linear straight chain alkylbenzene sulfonates in which the average number of carbon atoms in the alkyl group is from about 11 to 13, abbreviated as $C_{11-13}$LAS.

Other anionic surfactants useful as binder (or enrobing) materials in the bodies of the present invention are the water-soluble salts of the higher fatty acids or "soaps". This includes alkali metal soaps such as the sodium, potassium, ammonium, and alkylolammonium salts of the higher fatty acids containing from about 8 to about 24, and preferably from about 12 to about carbon atoms. Soaps can be made by direct saponification of fats and oils or by the neutralization of free fatty acids.

Anionic surfactants useful as binder (or enrobing) materials in the extrudates of the present invention also include the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule or unit and wherein the alkyl groups contain from about 8 to about 12 carbon atoms; and the sodium or potassium salts of alkyl ethylene oxide ether sulfates containing about 1 to about 10 units of ethylene oxide per molecule or unit and wherein the alkyl group contains from about 10 to about 20 carbon atoms.

Still other anionic surfactants useful as binder (or enrobing) materials in the bodies of the present invention include the water-soluble salts of the esters of alpha-sulfonated fatty acids containing from about 6 to about 20 carbon atoms in the fatty acid group and from about 1 to about 10 carbon atoms in the ester group; the water-soluble salts of 2-acyloxyalkane-1-sulfonic acids containing from about 2 to about 9 carbon atoms in the acyl group and from about 9 to about 23 carbon atoms in the alkane moiety; the water-soluble salts of olefin and paraffin sulfonates containing from about 12 to about 20 carbon atoms; and beta-alkyloxy alkane sulfonates containing from about 1 to about 3 carbon atoms in the alkyl group and from about 8 to about 20 carbon atoms in the alkane moiety.

Suitable film forming polymers useful as binder (or enrobing) materials in the extrudates of the present invention are the polymers derived from the monomers such as vinyl chloride, vinyl alcohol, furan, acrylonitrile, vinyl acetate, methyl acrylate, methyl methacrylate, styrene, vinyl methyl ether, vinyl ethyl ether, vinyl propyl ether, acrylamide, ethylene, propylene and 3-butenoic acid.

Preferred polymers of the above group are the homopolymers and copolymers of acrylic acid, hydroxyacrylic acid, or methacrylic acid, which in the case of the copolymers contain at least about 50%, and preferably at least about 80%, by weight, units derived from the acid. The particularly preferred polymer is sodium polyacrylate. Other specific preferred polymers are the homopolymers and copolymers of maleic anhydride, especially the copolymers with ethylene, styrene and vinyl methyl ether. These polymers are commercially available under the trade names Versicol and Gantrez.

Other film-forming polymers useful as binder (or enrobing) materials in the extrudates of the present invention include the cellulose sulfate esters such as cellulose acetate sulfate, cellulose sulfate, hydroxyethyl cellulose sulfate, methylcellulose sulfate and hydroxypropylcellulose sulfate.

In summary, preferred binder materials for use herein are selected from the group consisting of polyethylene glycols, most preferably of average molecular weight from about 4,000 to about 8,000; fatty acids, most preferably those containing from about 12 to about 18 carbon atoms; anionic surfactants, most preferably linear alkylbenzene sulfonate in which the average number of carbon atoms in the alkene moiety is about 11 to about 13; and mixtures thereof.

Bleach Activator Extrudates

The bleach activator compound and binder material are substantially evenly distributed throughout the bleach activator extrudates.

The bulk density of the stabilized bleach activator extrudates is between about 0.4 and about 0.8 grams per cubic centimeter (g/cc). This pour density is determined using the Ohaus dry pint method (Seedburo Equipment Co., Chicago, Ill.).

The amount of water in the stabilized bleach activator extrudate is less than about 5%, preferably less than about 3%, more preferably less than about 1.5%, by weight of the extrudate. The stabilized bleach activator is prepared by radial or axial extrusion, preferably axial. Axial extrusion produces cylindrical extrudates which have both good storage stability and good dispersibility in wash water. It is preferred that the binder material be in molten form when it is mixed with the powder bleach activator compound before extrusion. Preferred particle size distribution of the extrudates is through 14, on 35 Tyler mesh screens. The average particle size of the extrudates is from about 500 microns to about 2000 microns in diameter, and from about 500 microns to about 6000 microns in length. Preferred is from about 800 microns to about 1000 microns in diameter, and from about 2000 microns to about 4000 microns in length.

Coloring the Extrudates

The second step in the present invention is distributing on said stabilized bleach activator extrudate an aqueous solution consisting essentially of stable water-soluble dye or water-dispersible pigment and from about 5% to about 30% of water-soluble hydratable material. Preferably the dye or pigment comprises, by weight, from about 0.5% to about 5%, most preferably from about 1.0% to about 2.5%, of the aqueous solution.

The stable water-soluble dye, which is preferred, or water-dispersible pigment can be of any type and is included in the aqueous solution in sufficient amount to obtain the desired extrudate color. Normal dye application is about 0.03% to about 0.20% by weight of the finished dyed product. "Stable" is used here to mean that the dye or pigment is color stable when distributed on the surface of the bleach activator extrudates, and does not react adversely with the other ingredients in the final granular detergent product. Preferred water-soluble dyes are those triarylmethane dyes which are stable in this application. Highly preferred is from about 1.0% to about 2.5% by weight of Food, Drug & Cosmetic (FD&C) Blue Dye #1, Color Index (C.I.) #42090. This is the same as Color Index Food Blue #2 and can be obtained from Hilton Davis.

The aqueous solution is distributed, preferably in a substantially even manner such as by spraying, to maximize coverage of the extrudates, but minimize their exposure to water. It is believed that excess moisture on the surface of the extrudates causes them to stick together.

Surface coating of the extrudates with dye or pigment applied by this process is preferred over the use of a bleach activator particle (for example, a spray-dried particle) which has been colored inside and out. This is in part because, in theory, the attractively-colored surface coating of the instant extrudates is removed in the wash water so that any extrudates which may remain on fabric after washing are not so apparent to the consumer. Also, the presence of dye or pigment only on the surface minimizes the risk of fabric damage from the dye or pigment. Thus, it is believed that the product of this invention is superior to a colored particle which has absorbed dye or pigment throughout.

However, the main usefulness of this invention lies in the inclusion of the water-soluble hydratable material. It is believed that the water-soluble hydratable material comes out of the aqueous solution during the distribution process (preferably spraying) and absorbs the excess water once the dye or pigment has been conveyed by the distribution method. It is theorized that by removing this excess water the formation of visible agglomerates is prevented.

Water-soluble Hydratable Material

The water-soluble hydratable material of this invention is preferably inorganic. Inorganic hydratable materials include disodium dihydrogen pyrophosphate, tetrasodium monohydrogen tripolyphosphate, trisodium dihydrogen tripolyphosphate, sodium bicarbonate, acidified pentasodium tripolyphosphate, acidified borax and acidified aluminosilicates and mixtures thereof. The water-soluble hydratable material should have some hydration capacity when it is mixed in the aqueous solution.

More preferred are from about 5% to about 30% by weight of water-soluble hydratable inorganic salts. Most preferred are from about 15% to about 25% by weight of water-soluble strong acid hydratable salts such as sodium sulfate, magnesium sulfate, etc. Sodium sulfate, preferably at about a 20% by weight level, is highly preferred because it has a high number of hydratable sites. The water-soluble hydratable material should be thoroughly mixed in the aqueous solution before (preferred), during, or after the mixing in of the stable water-soluble dye or water-dispersible pigment.

The following is a highly preferred progression of events. First, about 20% by weight of anhydrous sodium sulfate is stirred into the solution until dissolved. Next, the water-soluble dye is mixed in water at the recommended level for coloring the stabilized bleach activator extrudates. For example, 1.2% by weight of FD&C Blue Dye #1 is stirred into water. The aqueous solution is then sprayed on the surface of stabilized nonanoyloxybenzene sulfonate extrudates. In our example, spray on is at the 1% level to get dye coverage of the extrudates without excess moisture. Preferred spray on of the aqueous solution, depending on the type of dye or pigment used, is from about 0.5% to about 2%.

Distribution can be by any means practical to get coverage of the extrudates without applying excess moisture. On a plant scale, the aqueous solution can be sprayed on with pulsating, metering spray nozzles or with non-pulsating two-fluid nozzles in a rotating mix drum.

Admixing in Final Product

The third and final step in this process invention is admixing the dyed or pigmented, stabilized bleach activator extrudates in a final granular detergent product. The extrudates represent from about 0.1% to about 20%, preferably from about 1% to about 10%, more preferably from about 3% to about 7%, by weight of the detergent product. The final product must comprise a peroxygen bleaching compound capable of yielding hydrogen peroxide in an aqueous solution, wherein the molar ratio of hydrogen peroxide yielded by the peroxygen bleaching compound to the bleach activator compound is greater than about 1.5. See U.S. Pat. No. 4,412,934, Chung et al., especially column 5, lines 10–39. The peroxygen bleaching compounds are well known in the art and include hydrogen peroxide and the alkali metal peroxides, organic peroxide bleaching compounds such as urea peroxide, and inorganic persalt bleaching compounds, such as the alkali metal perborates, perphosphates, and the like. Mixtures of such compounds may also be used.

Preferred peroxygen bleaching compounds include sodium perborate, commercially available in the form of mono- and tetra-hydrate, sodium carbonate peroxyhydrate, sodium pyrophosphate peroxyhydrate, urea peroxyhydrate, and sodium peroxide. Particularly preferred are sodium perborate tetrahydrate and, especially, sodium perborate monohydrate. Sodium perborate monohydrate is especially preferred because it is very stable during storage and yet still dissolves very quickly in the bleaching solution. It is believed that such rapid dissolution results in the formation of higher levels of percarboxylic acid and, thus, enhanced surface bleaching performance.

The preferred level of peroxygen bleaching compound is from about 1% to about 20%. From about 3% to about 5% sodium perborate monohydrate is highly preferred.

The final granular detergent product of this third step comprises any other ingredients commonly used in laundry or cleaning products. These include auxiliary detergent surfactant and builder materials, bleaching agents and bleach activators, suds boosters or suds suppressors, anti-tarnish and anticorrosion agents, soil suspending agents, soil release agents, fillers, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference.

The detergent surfactant can be any one or more surface active agents selected from anionic, nonionic, zwitterionic, amphoteric and cationic classes and compatible mixtures thereof. Detergent surfactants useful herein are listed in U.S. Pat. No. 3664,961, Norris, issued May 23, 1972, and in U.S. Pat. No. 3919,678, Laughlin et al., issued Dec. 30, 1975, both incorporated herein by reference. Useful cationic surfactants also include those described in U.S. Pat. No. 4,222,905, Cockrell, issued Sept. 16, 1980, and in U.S. Pat. No. 4,239,695, Murphy, issued Dec. 16, 1980, both incorporated herein by reference. The following are representative examples of detergent surfactants useful in the present compositions.

Water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alky portion of acyl groups). Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099, and 2,477,383. Especially valuable are linear straight chain alkylbenzene sulfonates in which the average number of carbon atoms in the alkyl group is from about 11 to 13, abbreviated as $C_{11-13}$ LAS.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium potassium salts of alkyl ethylene oxide ether sulfates containing about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin and paraffin sulfonates containing from about 12 to 20 carbon atoms; and beta-alkyloxy alkane sulfonates containing from about 1 to 3 carbon atoms in the alkyl group and from about 8 to 20 carbon atoms in the alkane moiety.

Water-soluble nonionic surfactants are also useful in the compositions of the invention. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol.

Preferred nonionic surfactants are the water-soluble and water-dispersible condensation products of aliphatic alcohols containing from 8 to 22 carbon atoms, in either straight chain or branched configuration, with from 3 to 12 moles of ethylene oxide per mole of alcohol. Particularly preferred are the condensation products of alcohols having an alkyl group containing from about 9 to 15 carbon atoms with from about 4 to 8 moles of ethylene oxide per mole of alcohol.

Semi-polar nonionic surfactants include water-soluble amine oxides containing one alkyl moiety of from about 10 to 18 carbon atoms and two moieties selected from the group of alkyl and hydroxyalkyl moieties of from about 1 to about 3 carbon atoms; water-soluble phosphine oxides containing one alkyl moiety of about 10 to 18 carbon atoms and two moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic surfactants include derivatives of aliphatic, quaternary, ammonium, phosphonium, and sulfonium compounds in which one of the aliphatic substituents contains from about 8 to 18 carbon atoms.

The level of detergent surfactant that can be employed is from about 1% to about 90%, preferably from about 5% to about 50% and most preferably from about 10% to about 30% by weight of the final granular detergent product.

In addition to detergent surfactants, detergency builders can be employed in the final granular detergent product. Water-soluble inorganic or organic electrolytes are suitable builders. The builder can also be water-insoluble calcium ion exchange materials; nonlimiting examples of suitable water-soluble, inorganic detergent builders include: alkali metal carbonates, borates, phosphates, bicarbonates and silicates. Specific examples of such salts include sodium and potassium tetraborates, bicarbonates, carbonates, orthophosphates, pyrophosphates, tripolyphosphates and metaphosphates.

The level of detergency builder that can be employed is from 0 to about 80%, preferably from about 3% to about 50%, and most preferably from about 5% to about 40% by weight of the final granular detergent product.

Examples of suitable organic alkaline detergency builders include: (1) water-soluble amino carboxylates and aminopolyacetates, for example, nitrilotriacetates, glycinates, ethylenediamine, tetraacetates, N-(2-hydroxyethyl)nitrilo diacetates and diethylenetriamine pentaacetates; (2) water-soluble salts of phytic acid, for example, sodium and potassium phytates; (3) water-soluble polyphosphonates, including sodium, potassium, and lithium salts of ethane-1-hydroxy-1, 1-diphosphonic acid; sodium, potassium, and lithium salts of ethylene diphosphonic acid; and the like; (4) water-soluble polycarboxylates such as the salts of lactic acid, succinic acid, malonic acid, maleic acid, citric acid, carboxymethyloxysuccinic acid, 2-oxa-1,1,3-propane tricarboxylic acid, 1,1,2,2-ethane tetracarboxylic acid, mellitic acid and pyromellitic acid; and (5) water-soluble polyacetals as disclosed in U.S. Pat. Nos. 4,144,266 and 4,246,495 incorporated herein by reference.

Another type of detergency builder material useful in the final granular detergent product comprises a water-soluble material capable of forming a water-insoluble reaction product with water hardness cations preferably in combination with a crystallization seed which is capable of providing growth sites for said reaction product. Such "seeded builder" compositions are fully disclosed in British Patent No. 1,424,406.

A further class of detergency builder materials useful in the present invention are insoluble sodium aluminosilicates, particularly those described in Belgian Patent No. 814,874, issued Nov. 12, 1974, as having the formula:

$$Na_z\text{—}(AlO_2)\text{—}(SiO_2)_yXH_2O$$

wherein z and y are integers equal to at least 6, the molar ratio of z to y is in the range of from 1.0:1 to about 0.5:1, and X is an integer from about 15 to about 264, said aluminosilicates having a calcium ion exchange capacity of at least 200 milligrams equivalent/gram and a calcium ion exchange rate of at least about 2 grain/-gallon/minute/gram. A preferred material is Zeolite A which is:

$Na_{12}—(SiO_2AlO_2)_{12}27H_2O$

The following nonlimiting examples illustrate the process and compositions of the present invention.

All parts, percentages and ratios herein are by weight unless otherwise specified.

EXAMPLE I

Dye solutions of the following compositions were prepared by adding components to a glass jar and stirring until total dissolution was attained.

| | (A) | (B) | (C) | (D) | (E) |
|---|---|---|---|---|---|
| | Parts by Weight | | | | |
| FD&C Blue Dye #1 | 1.3 | 1.3 | 1.3 | 1.3 | 1.3 |
| Anhydrous Sodium Sulfate | 0.0 | 5.0 | 10.0 | 15.0 | 20.0 |
| Water | 98.7 | 93.7 | 88.7 | 83.7 | 78.7 |

Stabilized nonanoyloxybenzene sulfonate (NOBS) extrudates were dyed at a dye level of 1% using dye solutions A, B, C, D, and E above, by adding 1 gram of dye solution at ambient temperature via pipet to 99 grams of stabilized NOBS in a glass jar. The jars were lidded and then shaken for approximately 1 minute to distribute the dye solution over the surfaces of the extrudates. Visual assessment indicated that all samples which contained sodium sulfate in the dye solution yielded markedly less agglomeration of dyed NOBS extrudates and more even dye coverage compared to the sample using dye solution A. The higher the level of sulfate, (up to 20%), the better the results. Total elimination of agglomerates was achieved using dye solution E. The results remain unchanged after two months.

EXAMPLE II

Stabilized NOBS extrudates are dyed in a plant-scale process as follows:

1. Mix all dye solution components in an agitated tank. First, add 1576 pounds (714.86 kilograms) of water at 95° F.-110° F. (35° C.-43.3° C.) to the tank. While agitating, add 400 pounds (181.44 kilograms) of anhydrous sodium sulfate and mix for 5 minutes. Add 24 pounds (10.89 kilograms) of FD&C Blue Dye #1 and mix an additional 10 minutes.

2. The dye solution is distributed by spraying using pulsating, metering spray nozzles onto the NOBS extrudates at a level of 1.0% in a rotating, inclined drum mixer.

3. The dyed NOBS extrudates exit the drum and are admixed with other components of a laundry detergent product. This is done with various laundry detergent compositions.

EXAMPLE III

Dye solutions of the following compositions were prepared by adding components to a glass jar and stirring until total dissolution was attained.

| | (A) | (B) |
|---|---|---|
| | Parts by Weight | |
| FD&C Blue Dye #1 | 2.0 | 2.0 |
| Anhydrous Sodium Sulfate | 0.0 | 20.0 |
| Water | 98.0 | 78.0 |

Stabilized NOBS extrudates were dyed at a level of 2.0% using dye solutions A and B by spraying to distribute the dye solution onto the NOBS extrudates in a laboratory batch mixer. Cake strengths were measured at initial, 10, 20, 30 minutes and 24 hours. Results show that the sample containing sulfate in the dye solution yielded desirable low cake strengths more quickly than the sample without sulfate. Specific results are shown below.

| Dyed NOBS Cake Strength (pounds-force) - 5 min @ 10 lb | | | | | |
|---|---|---|---|---|---|
| | Initial | 10 min | 20 min | 30 min | 24 hr. |
| Sample A | 13.2 | 6.4 | 4.8 | 4.8 | 2.7 |
| Sample B | 6.6 | 3.7 | 3.9 | 3.9 | 3.9 |

Cake strength basically measures compressibility of these extrudates. It is believed that agglomerated extrudates are more malleable, requiring more force to break apart than unagglomerated extrudates. Lower cake strength as demonstrated by Sample B (with sodium sulfate) is more desirable.

EXAMPLE IV

A granular laundry detergent composition comprising the colored bleach activator extrudates of the present invention is as follows.

| Ingredient | Weight Percent |
|---|---|
| 1. Spray-dried detergent base granules: | |
| Sodium $C_{13}$ linear alkylbenzene sulfonate (70%)/ Sodium $C_{14-15}$ alkyl sulfate (30%) | 12.88 |
| Sodium tripolyphosphate | 4.56 |
| Tetrasodium pyrophosphate | 17.16 |
| Sodium silicate (1.6 ratio) | 7.20 |
| Diethylenetriamine pentaacetic acid | 0.38 |
| Brightener | 0.18 |
| Sodium polyacrylate (MW 4500) | 0.96 |
| Polyethylene glycol (MW 8000) | 0.29 |
| Water* | 3.0 |
| Sodium sulfate & miscellaneous | 21.09 |
| 2. Spray on base granules: | |
| Perfume | 0.15 |
| $C_{12-13}$ alcohol polyethoxylate (6.5)** | 0.44 |
| 3. Admix with base granules: | |
| Sodium carbonate | 22.00 |
| Enzyme-Savinase (Novo) | 0.37 |
| Sodium perborate monohydrate (solids) | 3.69 |
| Nonanoyloxybenzene sulfonate | 5.26 |

*Remaining water is brought in with admixes.

**Alcohol and monoexthoxylated alcohol removed.

The nonanoyloxybenzene sulfonate is added as extrudates which are colored blue prior to admixing by spraying onto the extrudates a 1% solution consisting of FD&C Blue Dye #1 and anhydrous sodium sulfate made according to Example II.

The above granular detergent composition is made as follows. Spray-dried detergent base granules are formed by adding the above-named ingredients in step 1 to a crutcher, mixing, and then spray-drying by conventional methods. The perfume and nonionic surfactant of step 2 are then sprayed onto the detergent base granules. This product is admixed with the above-named ingredients in step 3 to form a finished detergent composition.

What is claimed is:

1. A process for the production of colored stabilized bleach activator extrudates, said process comprising the steps of:

(a) obtaining stabilized bleach activator extrudates comprising, by weight:

(i) from about 50% to about 98% of bleach activator compound of the general formula

wherein R is an alkyl group containing from about 5 to about 18 carbon atoms wherein the longest linear alkyl chain extending from and including the carbonyl carbon contains from about 6 to about 10 carbon atoms and L is a leaving group, the conjugate acid of which has a pKa in the range of from about 6 to about 13; and (ii) from about 2% to about 50% of a binder material selected from the group consisting of nonionic surfactants, polyethylene glycols, anionic surfactants, film forming polymers, fatty acids, and mixtures thereof, wherein said binder does not melt below about 40° C.;

wherein (i) and (ii) are substantially evenly distributed throughout said extrudates; the bulk density of said extrudates is between about 0.4-0.8 g/cc; and the amount of water in said extrudates is less than about 5%;

(b) distributing on said stabilized bleach activator extrudates from about 0.5% to about 2% by weight of an aqueous solution consisting essentially of stable water-soluble dye and from about 5% to about 30% by weight of water-soluble hydratable material; and (c) admixing said resulting dyed stabilized bleach activator extrudates in a final granular detergent product comprising a peroxygen bleaching compound capable of yielding hydrogen peroxide in an aqueous solution, wherein the molar ratio of hydrogen peroxide yielded by said peroxygen bleaching compound to said bleach activator compound is greater than about 1.5.

2. A process according to claim 1 wherein the R group in the bleach activator compound contains from about 7 to about 11 carbon atoms.

3. A process according to claim 1 wherein L is a leaving group the conjugate acid of which has a pKa in the range of from about 8 to about 11.

4. A process according to claim 2 wherein L is selected from the group consisting of

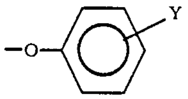

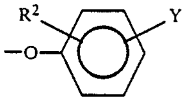

and

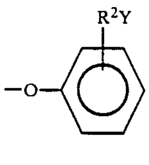

wherein $R^2$ is an alkyl chain containing from about 1 to about 8 carbon atoms, and Y is $-SO_3^-M^+$ or $-COO^-M^+$ wherein $M^+$ is sodium or potassium.

5. A process according to claim 4 wherein the stabilized bleach activator extrudate is comprised of from about 80% to about 90% by weight, of the bleach activator compound.

6. A process according to claim 5 wherein the bleach activator compound has the general formula

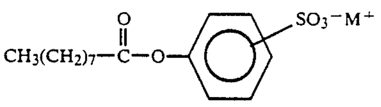

wherein $M^+$ is sodium or potassium.

7. A process according to claim 1 wherein the stabilized bleach activator extrudate is comprised of from about 10% to about 20% by weight, of binder material selected from the group consisting of polyethylene glycols, anionic surfactants, fatty acids, and mixtures thereof.

8. A process according to claim 7 wherein the binder material is selected from the group consisting of polyethylene glycols of molecular weight from about 4,000 to about 8,000, fatty acids containing from about 12 to about 18 carbon atoms, linear alkylbenzene sulfonate in which the average number of carbon atoms in the alkene moiety is about to about 13; and mixtures thereof.

9. A process according to claim 8 wherein the amount of water in the stabilized bleach activator extrudates is less than about 1.5% by weight.

10. A process according to claim 1 wherein the stabilized bleach activator extrudates have an average particle size of from about 500 microns to about 2000 microns in diameter and from about 500 microns to about 6000 microns in length.

11. A process according to claim 9 wherein the stabilized bleach activator extrudates have an average particle size of from about 800 microns to about 1000 microns in diameter and from about 2000 microns to about 4000 microns in length.

12. A process according to claim 6 wherein the aqueous solution is sprayed on the surface of the stabilized bleach activator extrudate and consists essentially of from about 0.5% to about 5% of stable water-soluble dye and from about 5% to about 30% of water-soluble hydratable inorganic material.

13. A process according to claim 7 wherein the aqueous solution is sprayed on the surface of the stabilized bleach activator extrudate and consists essentially of from about 1% to about 2.5% of stable triarylmethane dye and from about 5% to about 30% of water-soluble hydratable inorganic salt.

14. A process according to claim 8 wherein the aqueous solution is sprayed on the surface of the stabilized bleach activator extrudate and consists essentially of from about 15% to about 25% of water-soluble strong acid hydratable salts.

15. A process according to claim 9 wherein the aqueous solution is sprayed on the surface of the stabilized bleach activator extrudate and consists essentially of from about 1.0% to about 2.5% FD&C Blue Dye #1 (C.I. # 42090) and about 20% by weight of sodium sulfate.

* * * * *